(12) United States Patent
Quinlan

(10) Patent No.: US 10,939,622 B2
(45) Date of Patent: Mar. 9, 2021

(54) HORTICULTURAL CONTAINER WITH TAG SLOT

(71) Applicant: THE HC COMPANIES, INC., Twinsburg, OH (US)

(72) Inventor: Robert Quinlan, Stow, OH (US)

(73) Assignee: THE HC COMPANIES, INC., Twinsburg, OH (US)

( * ) Notice: Subject to any disclaimer, the term of this patent is extended or adjusted under 35 U.S.C. 154(b) by 421 days.

(21) Appl. No.: 15/645,542

(22) Filed: Jul. 10, 2017

(65) Prior Publication Data

US 2018/0007840 A1   Jan. 11, 2018

Related U.S. Application Data

(60) Provisional application No. 62/360,405, filed on Jul. 10, 2016.

(51) Int. Cl.
| | | |
|---|---|---|
| *A01G 9/00* | (2018.01) | |
| *A01G 9/02* | (2018.01) | |
| *G09F 3/02* | (2006.01) | |
| *G09F 3/04* | (2006.01) | |

(52) U.S. Cl.
CPC ............. *A01G 9/006* (2013.01); *A01G 9/02* (2013.01); *A01G 9/021* (2013.01); *G09F 3/02* (2013.01); *G09F 3/04* (2013.01); *G09F 2003/0272* (2013.01)

(58) Field of Classification Search
CPC .......... A01G 9/006; A01G 9/021; A01G 9/02; G09F 3/04; G09F 3/02; G09F 2003/0272; A47G 7/042; A47G 7/044; A47G 7/045; A47G 7/047
See application file for complete search history.

(56) References Cited

U.S. PATENT DOCUMENTS

| | | | | |
|---|---|---|---|---|
| 5,865,339 A * | 2/1999 | Carlson | ............... | G09F 3/04 |
| | | | | 206/459.1 |
| 6,131,323 A * | 10/2000 | Wong | ............... | A01G 9/0295 |
| | | | | 40/645 |
| 6,199,319 B1 | 3/2001 | Skinner | | |
| 6,463,696 B2 * | 10/2002 | Skinner | ............... | A01G 9/02 |
| | | | | 47/66.6 |
| 7,624,536 B2 * | 12/2009 | Schromm | ............... | A01G 9/02 |
| | | | | 40/645 |
| 7,628,950 B2 * | 12/2009 | Hansen | ............... | A01G 9/021 |
| | | | | 206/423 |
| 8,685,300 B2 | 4/2014 | Bosch | | |
| 2001/0002519 A1* | 6/2001 | Skinner | ............... | A01G 9/02 |
| | | | | 47/65.5 |

(Continued)

FOREIGN PATENT DOCUMENTS

| | | | | |
|---|---|---|---|---|
| DE | 102006006264 A1 * | 8/2007 | ............. | A01G 9/088 |
| WO | WO-0129806 A1 * | 4/2001 | ............. | G09F 3/206 |

*Primary Examiner* — Marc Burgess
(74) *Attorney, Agent, or Firm* — Tucker Ellis LLP

(57) ABSTRACT

Provided is a horticultural container including a body, a base extending from a bottom of the body, and an upper rim extending from a top of the body. The upper rim has a tag slot extending therethrough for receiving a tag and a chamfer radially outwardly spaced from and adjacent to the tag slot for receiving ears of the tag when the tag is in the tag slot. In this way, the tag is received in the tag slot and chamfer to secure the tag to hinder or prevent unauthorized removal of the tag.

18 Claims, 9 Drawing Sheets

(56) References Cited

U.S. PATENT DOCUMENTS

| | | | | |
|---|---|---|---|---|
| 2006/0117628 A1* | 6/2006 | Faulkner | ................... | G09F 3/04 |
| | | | | 40/645 |
| 2007/0227067 A1* | 10/2007 | Sieverding | ............. | A01G 9/021 |
| | | | | 47/65.5 |
| 2010/0154303 A1* | 6/2010 | Smith | ....................... | A01G 9/02 |
| | | | | 47/66.7 |
| 2016/0165806 A1* | 6/2016 | Ying | ...................... | A01G 9/006 |
| | | | | 47/66.6 |

* cited by examiner

US 10,939,622 B2

HORTICULTURAL CONTAINER WITH TAG SLOT

RELATED APPLICATIONS

This application claims the benefit of U.S. Provisional Application No. 62/360,405 filed Jul. 10, 2016, which is hereby incorporated herein by reference.

FIELD OF INVENTION

The present invention relates generally to horticultural containers, and more particularly to horticultural containers with tag slots.

BACKGROUND

Plants are often sold in pre-planted arrangements in horticultural containers, such as planters and hanging baskets. The identification of the type or types of plants in a container as well as care or growing instructions may be printed on a tag that is hung from a slot in the container. The slot may be present in an upper rim of the container and a portion of the tag is inserted upwardly or downwardly through the slot such that the main body of the tag with the printed information hangs adjacent the sidewall of the container or above the upper rim.

The tags may be made from plastic sheet material or paper that has been laminated with a thin layer of plastic or coated with wax. The tags may be thin and flexible and/or subject to curling, especially after being exposed to water and/or sunlight. For tags inserted downwardly through the slot such that the main body of the tag with the printed information is located above the upper rim, the tags may have a tendency to collapse, curl or sag downward.

Different types of plants or different planter sizes may be sold at different prices. The pricing information for a container and its associated plants may be printed on the tag in one or more forms, such as a price readable by persons, SKU information, a bar code readable by a scanner of a point of sale terminal, etc. Unfortunately, it has been found that unscrupulous customers may perform tag swapping by removing the tag from a desired container of plants and from a less expensive container of plants, and inserting the tag having the lower price information into the tag slot of the more expensive desired container of plants. The less expensive container of plants may then be left without a tag or with an incorrect tag if the customer places the tag from the desired container into the tag slot of the less expensive container.

SUMMARY OF INVENTION

The present application provides a horticultural container including a body, a base extending from a bottom of the body, and an upper rim extending from a top of the body. The upper rim has a tag slot extending therethrough for receiving a tag and a chamfer radially outwardly spaced from and adjacent to the tag slot for receiving ears of the tag when the tag is in the tag slot. In this way, the tag is received in the tag slot and the ears radially overlap the chamfer to secure the tag to hinder or prevent unauthorized removal of the tag.

In an embodiment, a horticultural container is provided that includes a body defining a chamber, a base extending from a bottom of the body to form with the body a closed end of the chamber, and an upper rim extending from a top of the body, the upper rim having a tag slot extending therethrough for receiving a tag, and a chamfer radially outwardly spaced from and adjacent to the tag slot for receiving ears of the tag when the tag is in the tag slot.

In another embodiment, a horticultural display system is provided that includes a horticultural container including a body defining a chamber, a base attached to a bottom of the body, and an upper rim extending from a top of the body, the upper rim having a tag slot extending therethrough and a chamfer radially outwardly spaced from and adjacent to the tag slot, and a tag having a body, a neck extending upward from the body, a head extending upward from the neck, and a pair of ears on opposite sides of the head, wherein the head of the tag extends above the tag slot such that the neck is disposed in the tag slot and the ears radially overlap the chamfer to secure the tag in the tag slot.

In still another embodiment, a horticultural container is provided that includes a body defining a chamber and having a longitudinal axis, and an upper rim extending from a top of the body, the upper rim having a horizontal portion that extends radially outward from the top of the body, a downwardly projecting portion that extends downwardly from an outer edge of the horizontal portion towards the bottom of the body, a tag slot extending through the horizontal portion for receiving a tag, and a chamfer radially outwardly spaced from and adjacent to the tag slot for receiving ears of the tag when the tag is in the tag slot, wherein the chamfer has a length in a circumferential direction relative to the longitudinal axis that is greater than a length of the tag slot in the circumferential direction.

The foregoing and other features of the application are described below with reference to the drawings.

DETAILED DESCRIPTION

Figure 1:
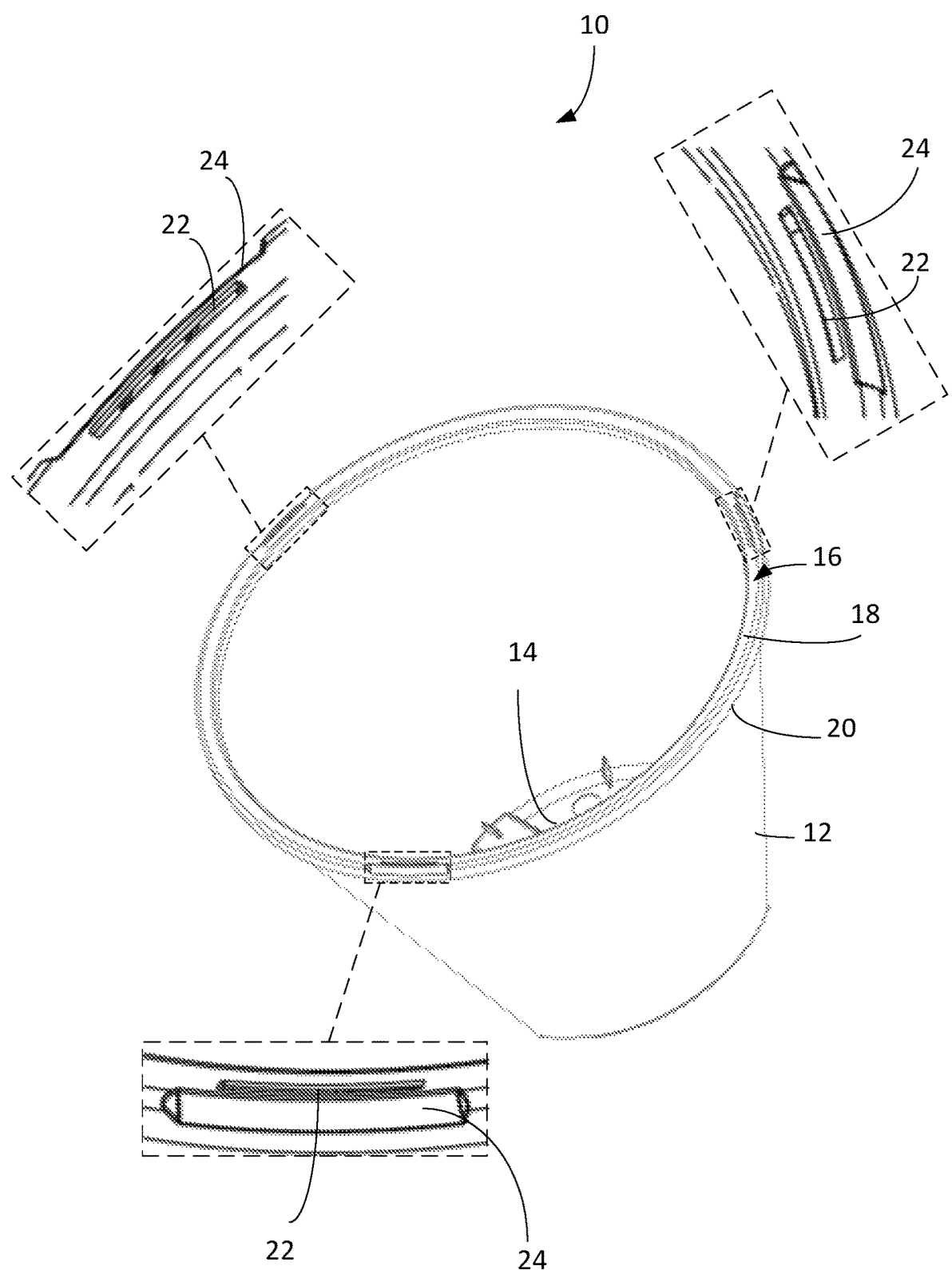
FIG. 1 is a perspective view of an exemplary horticultural container.

Turning initially to FIG. 1, an exemplary horticultural container is shown at reference numerals 10. The horticultural container 10 includes a body or sidewall 12 that may be conical and defining a chamber, a base 14 extending from a bottom of the sidewall 12 to form with the sidewall a closed end of the chamber, and an upper rim 16 extending from a top of the sidewall circumscribing the sidewall. The upper rim 16 has a horizontal portion 18 that extends radially outward from an upper end of the sidewall 12 and a downwardly projecting portion 20 that extends downwardly from an outer edge of the horizontal portion 18 generally concentric with the sidewall 12 and towards the bottom of the sidewall 12 thereby forming with the upper end of the sidewall 12 an inverted, flat-bottomed substantially U-shaped structure. The upper rim 16 includes one or more tag slots 22, and in the illustrated embodiment three tag slots circumferentially spaced around the upper rim 16, and one or more chamfers or bevels 24, and in the illustrated embodiment three chamfers 24 radially outwardly spaced from and adjacent to a respective one of the tag slots 22. It will be appreciated that any suitable number of tag slots and chamfers may be provided.

The tag slots 22 are provided for receiving a tag 26 (FIG. 2) that, for example, provides identification information and/or one or more pictures of the plant in the horticultural container 10, and the chamfers 24 are provided for receiving ears 28 of the tag. The tag slots and/or chamfers may be formed during molding, which may be made from plastic material by, for example, injection molding, or the tag slots and/or chamfers may be formed by removing material after molding. The tag slots 22 are elongated slit-like features that form through passages in the horizontal portion 18 of the upper rim 16 that extend in the circumferential direction of the container 10 relative to a longitudinal axis of the container, and have a length L1 in the circumferential direction and a width W1 in the radial direction. The chamfers 24 are elongated features formed in the horizontal portion 18 and the downwardly projection portion 20, and have a length L2 in the circumferential direction and a width W2 in the radial direction. The length of each chamfer 24 is greater than the length of the respective tag slot 22. As shown, a radially inner edge of the chamfer 24 is spaced apart from a radially outer edge of the tag slot 22 by a defined distance. Depending on a width of the upper rim 16 in the radial direction, the tag slot and chamfer need not be radially centered in the upper rim.

Figure 7:
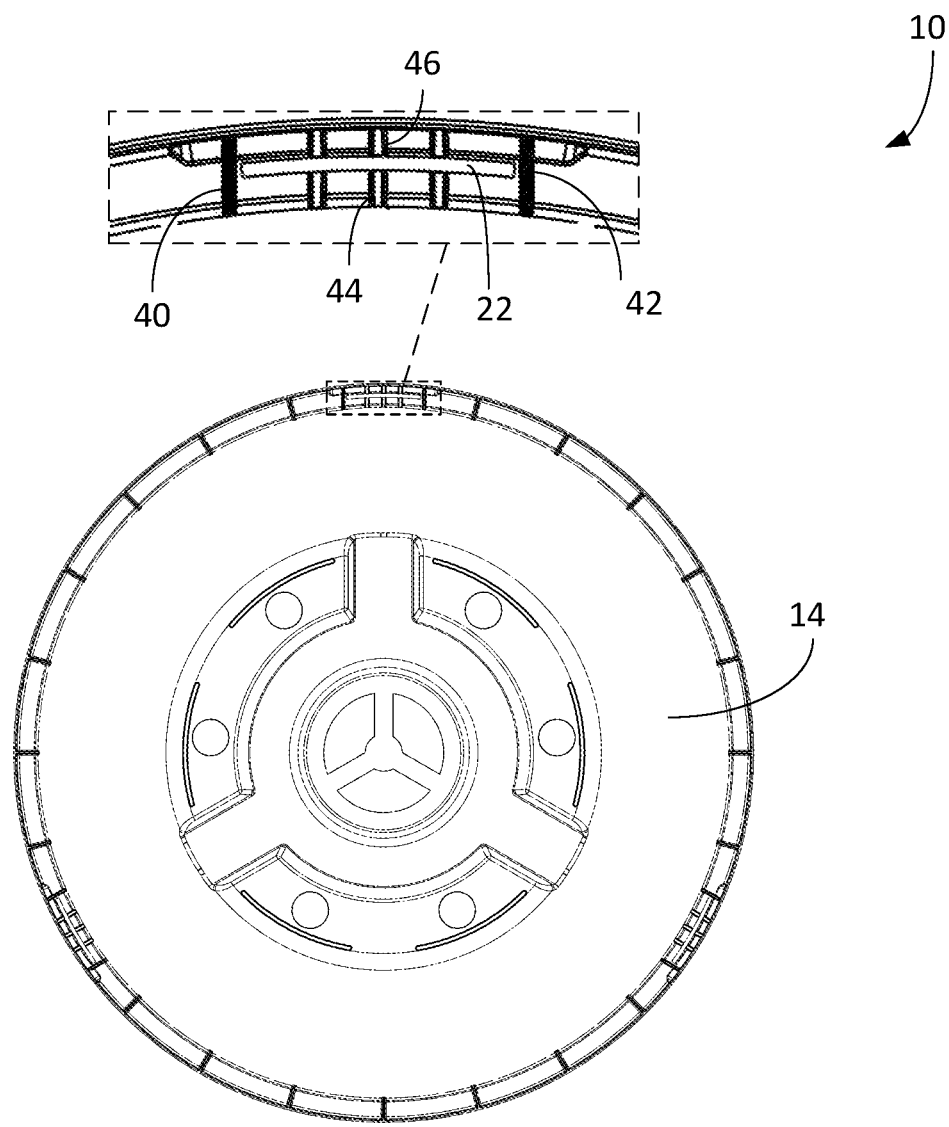
FIG. 7 is a bottom view of the horticultural container.

Referring additionally to FIG. 7, the horticultural container 10 includes a plurality of guide ribs on an underside of the horizontal portion 18 adjacent each tag slot 22 for guiding the tag 26 when inserted through the tag slot 22 from underneath the upper rim 16 and for enhancing structural integrity. The plurality of guide ribs include ribs 40 and 42 adjacent opposite ends of the tag slot 22 to circumferentially align the tag 26 relative to the slot 22 during insertion, a plurality of ribs 44 between the sidewall 12 and the tag slot 22 to radially align the tag 26, and a plurality of ribs 46 between the tag slot 22 and the outer edge of the horizontal portion 18 to radially align the tag 26. In an embodiment, the ribs 44 and/or the ribs 46 are angled towards the tag slot 22 such that the ribs 44 and 46 taper to a smaller axial thickness as they respectively near the tag slot 22 in the radial direction.

Figure 2:
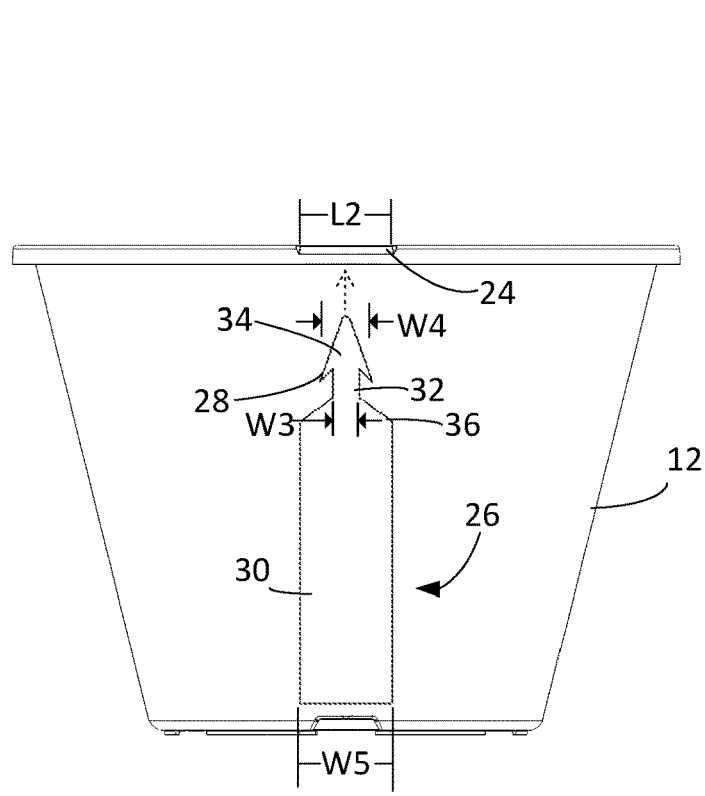
FIG. 2 is a front view of the horticultural container and a tag.
Figure 3:
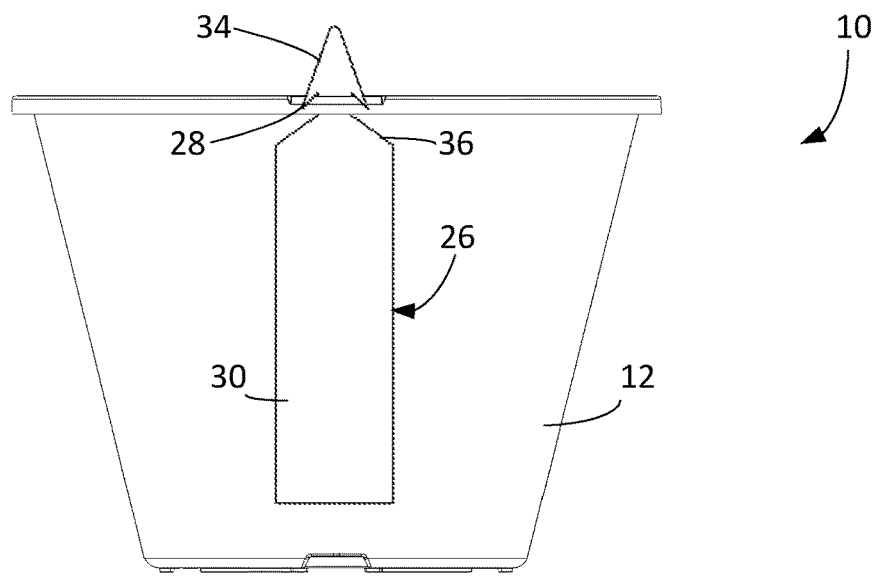
FIG. 3 is a front view of the horticultural container with the tag received in a tag slot.
Figure 4:
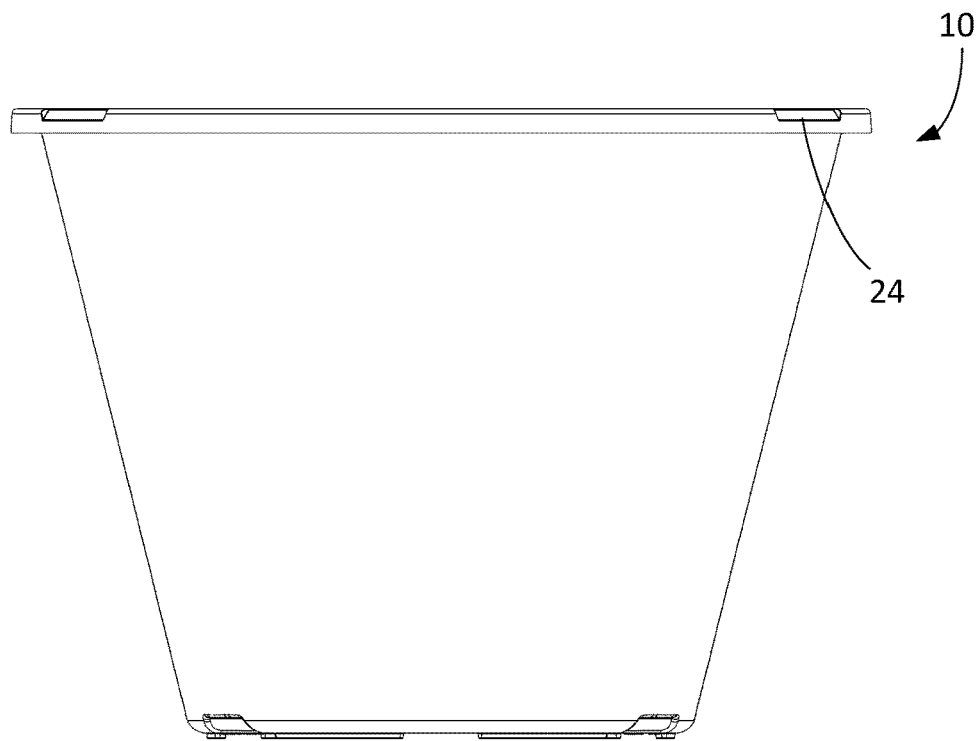
FIG. 4 is back view of the horticultural container.
Figure 5:
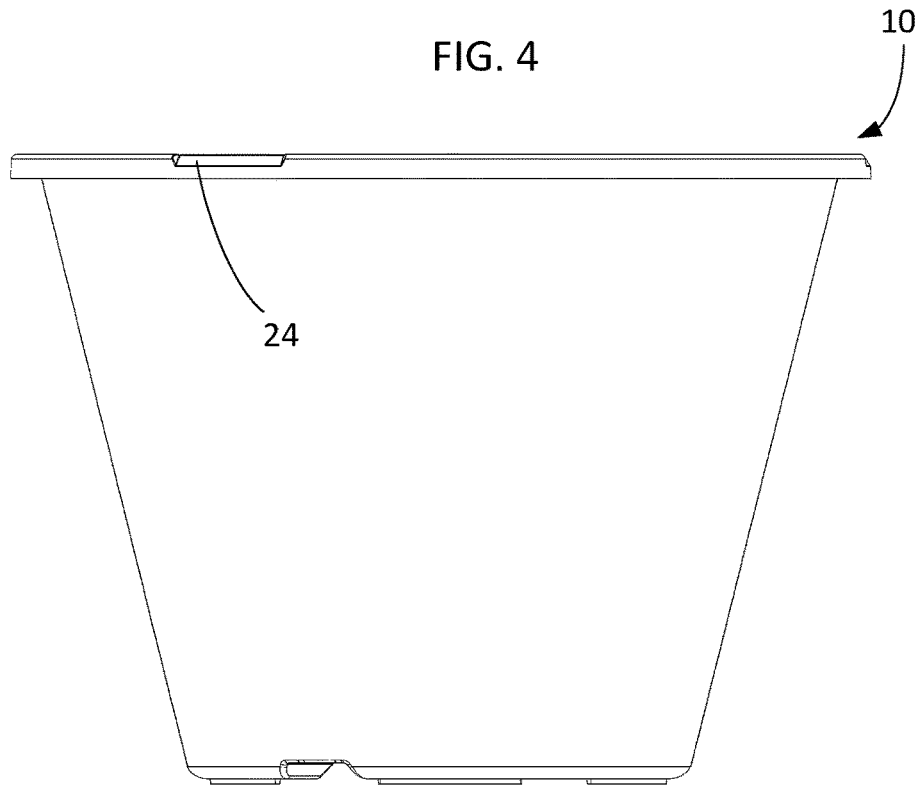
FIG. 5 is a side view of the horticultural container.
Figure 6:
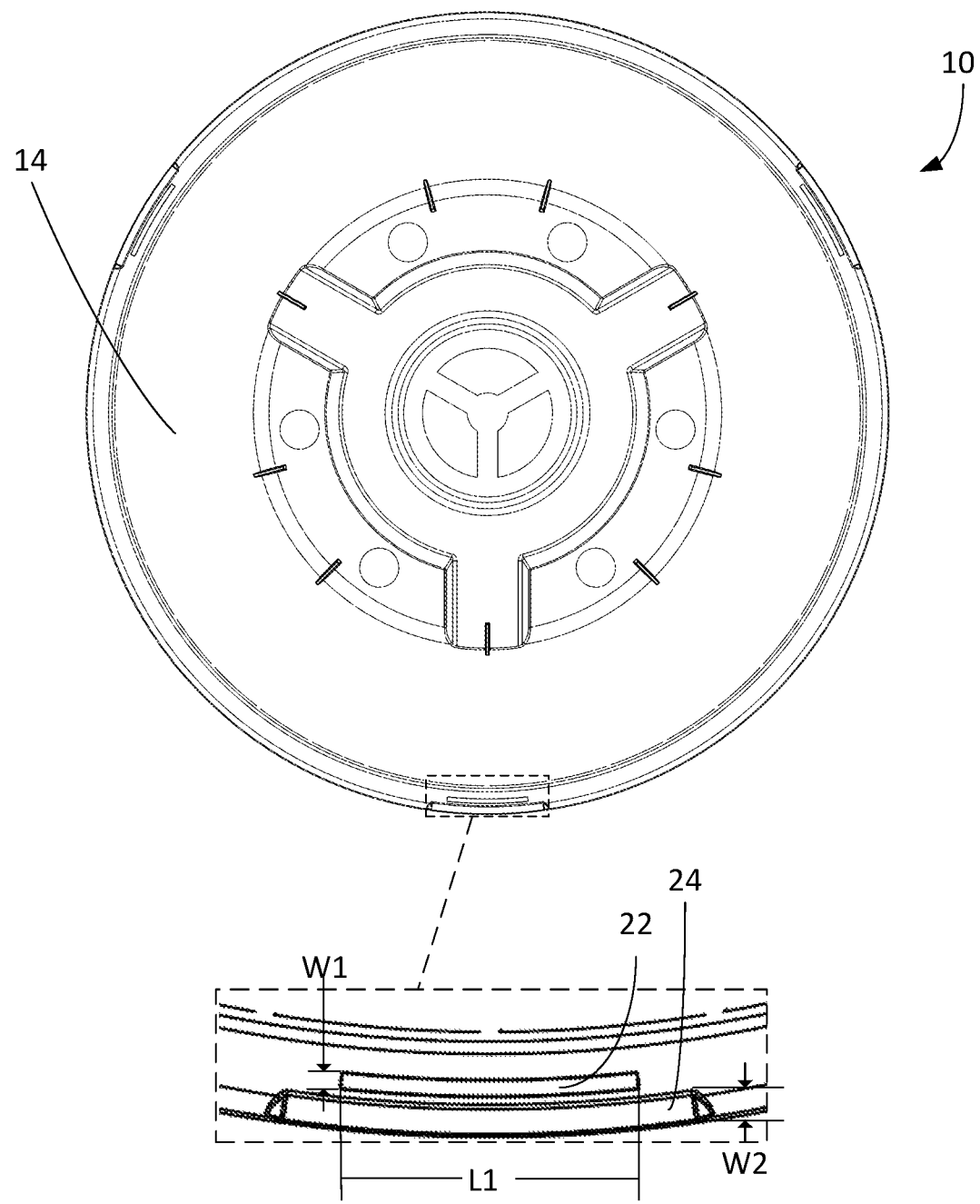
FIG. 6 is a top view of the horticultural container.

Turning now to FIGS. 2 and 3, the tag 26 is shown as it is inserted from underneath the upper rim 16 and as disposed in the tag slot 22 respectively. The tag 26 has a body 30, a neck 32 extending upward from the body 30, a head 34 extending upward from the neck 32 and having the pair of ears 28 on opposite sides thereof, and shoulders 36 from which the neck 32 extends to form a sloped connection between the neck 32 and the body 30. The neck 32 has a width W3 that is less than the length L1 of the tag slot 22, the head 34 has a width W4 that is greater than the length L1 of the tag slot 22, and the body 30 has a width W5 greater than the width W4 of the head. Flexibility of the tag 26 allows for insertion of the head 34 of the tag 26 all the way through the tag slot 22 from below the slot as shown in FIG. 2. The neck 32 has a length that is established such that, after insertion of the head 34 through the tag slot 22, the tag 26 becomes trapped by the upper rim 16 such that if upward force is applied to the tag 26, then the shoulders 36 engage an underside of the upper rim 16 to prevent further upward movement of the tag 26.

As shown in FIG. 3, the head 34 of the tag 26 extends above the tag slot 22 such that the neck 32 is disposed in the tag slot 22 and the ears 28 radially overlap the chamfer 24 to secure the tag 22 in the tag slot 26. The defined distance may assist in establishing the radial overlap of ears 28 of the tag 26 and the chamfer 24. In an embodiment, the tag may be scored to assist in the ears 28 overlapping the chamfer 24. In an embodiment, the tag 26 has a curvature along its width that is radially opposite a curvature of the sidewall 12 and the defined distance between the tag slot 22 and the chamfer 24 is equal to or less than a nominal radial offset of the ends of the ears 28 of the tag 26 from the body 30 of the tag.

To install the tag 26 in one of the tag slots 22, the tag 26 is inserted from underneath the upper rim 16 as shown in FIG. 2. As the head 34 approaches the tag slot 22, the guide ribs 40 and 42 circumferentially align the head 34 with the tag slot 22, and the guide ribs 44 and 46 radially align the head 34 with the tag slot 22. The head 34 is advanced through the tag slot 22 and the ears 28 flex to fit through the tag slot 22. The tag 26 is advanced until the ears 28 have passed completely through the tag slot 22 to radially overlap the chamfer 24 and become hooked over the upper rim 16 and the neck 32 is disposed in the tag slot 22. If the tag 26 is moved upward after engagement, the shoulders 36 engage the underside of the upper rim 16 to prevent further upward movement and removal of the tag 26. If the tag 26 is moved downward after engagement with a sufficient downward force, one or both of the ears 28 that are radially overlapped with the chamfer 24 will shear off of the tag 26 thereby preventing reuse of the tag, for example during unauthorized tag swapping, and allowing for easy removal of the tag by the end user after purchase.

Figure 8:
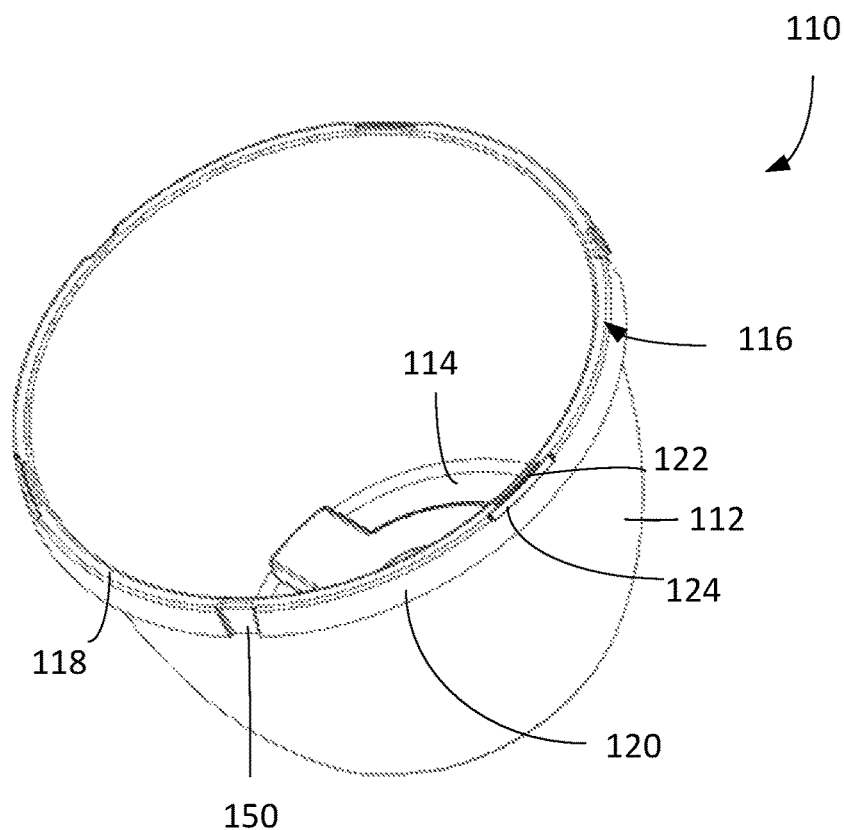
FIG. 8 is a perspective view of another exemplary horticultural container.
Figure 9:
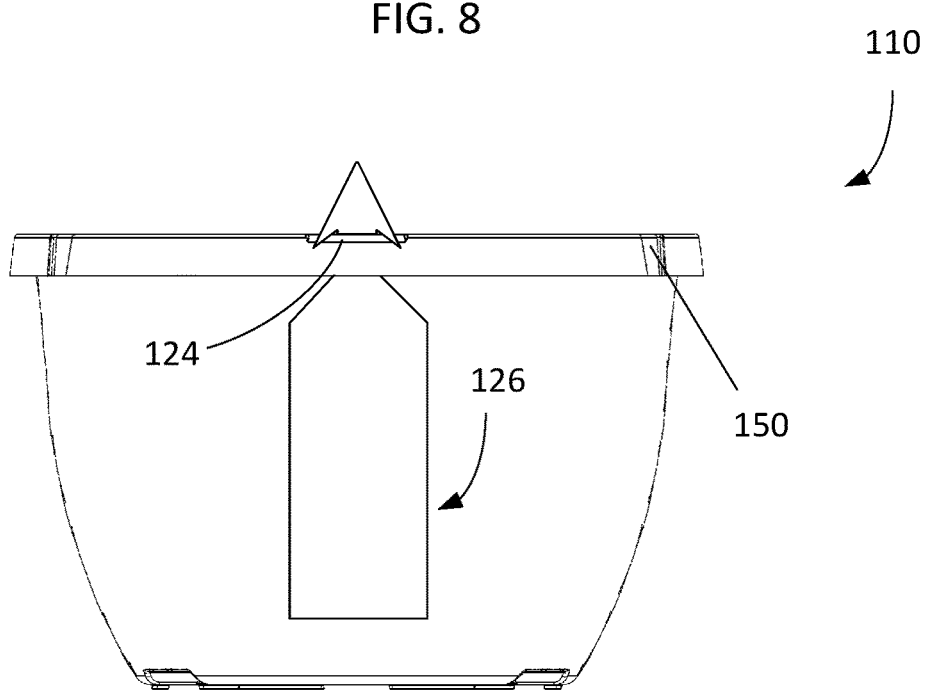
FIG. 9 is a front view of the horticultural container with a tag received in a tag slot.
Figure 10:
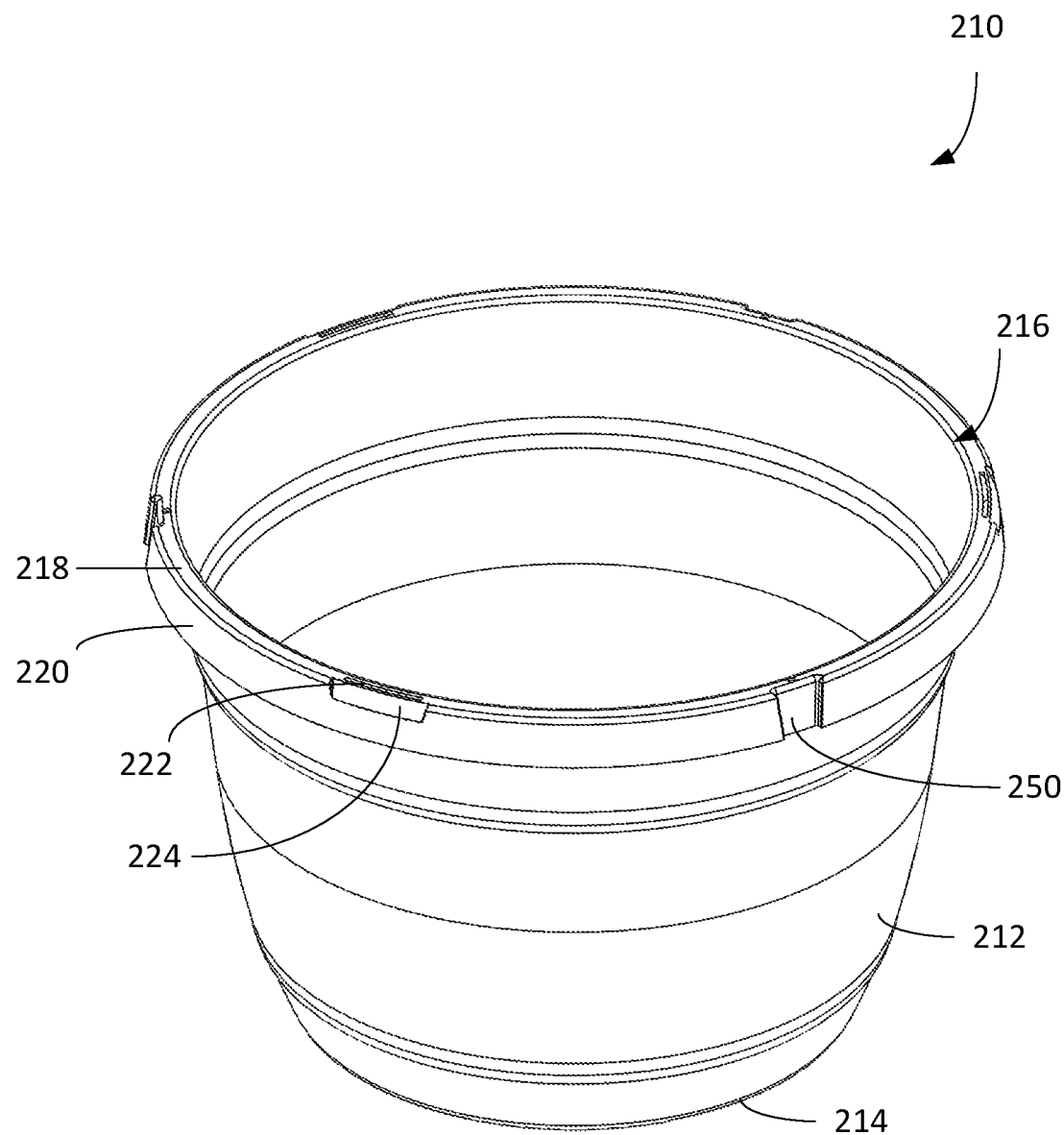
FIG. 10 is a perspective view of still another exemplary horticultural container.
Figure 11:
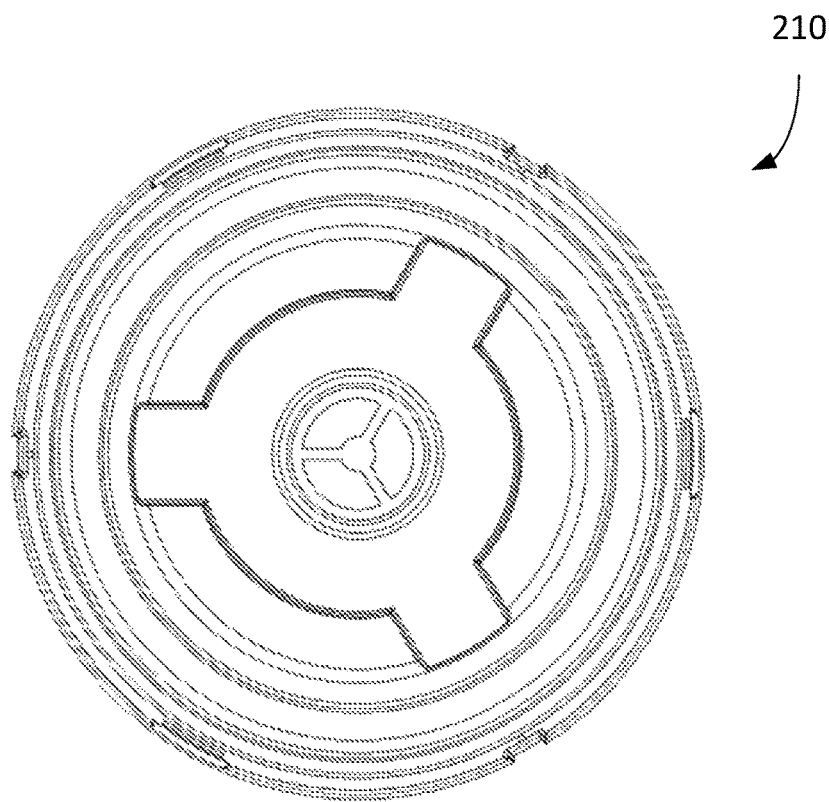
FIG. 11 is a top view of the horticultural container.
Figure 12:
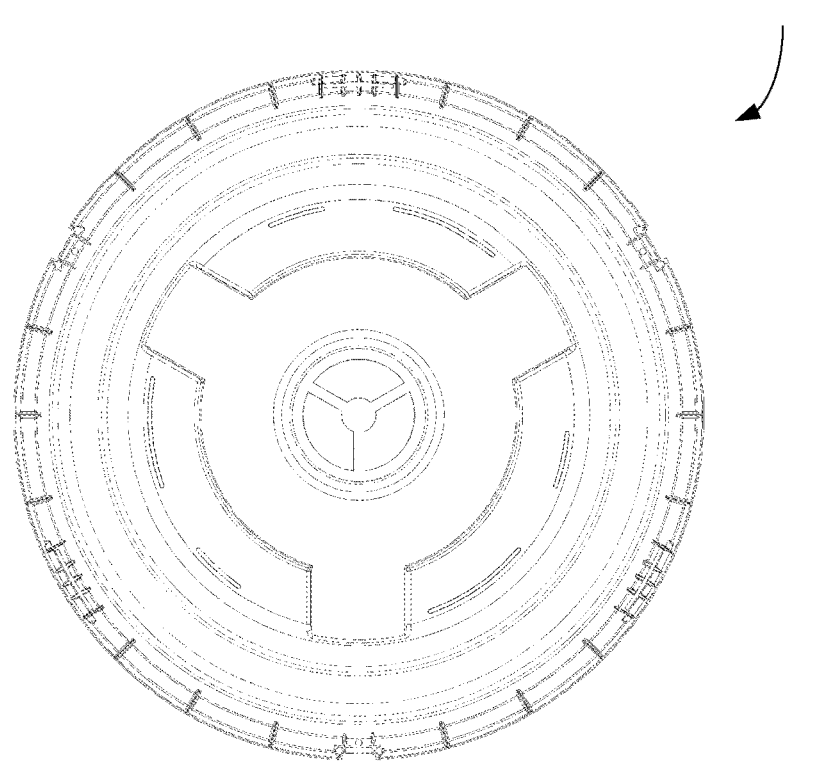
FIG. 12 is a bottom view of the horticultural container.
Figure 13:
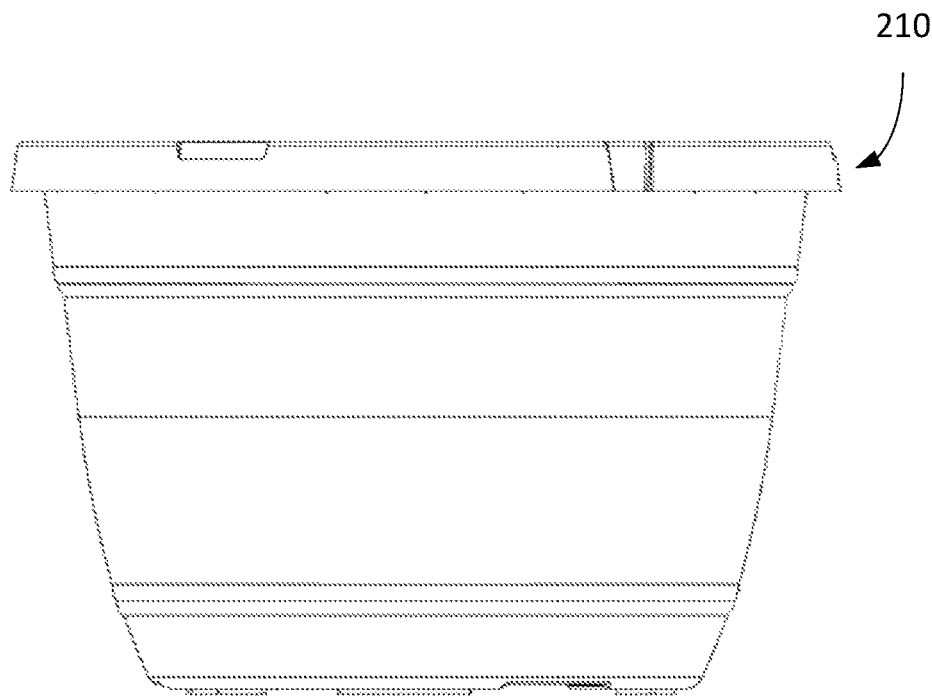
FIG. 13 is a side view of the horticultural container.
Figure 14:
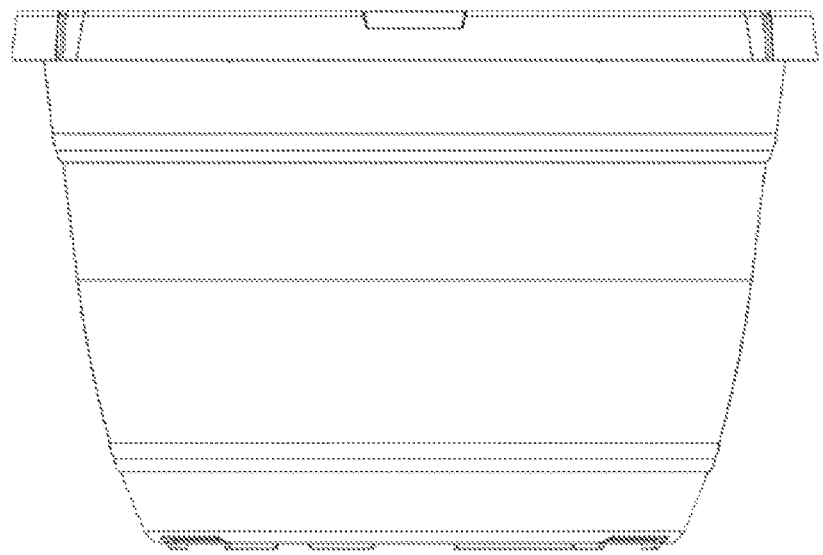
FIG. 14 is a front view of the horticultural container.

Turning now to FIGS. 8 and 9, an exemplary embodiment of the horticultural container is shown at 110. The horticultural container 110 is substantially the same as the above-referenced horticultural container 10, and consequently the same reference numerals but indexed by 100 are used to denote structures corresponding to similar structures in the horticultural containers. In addition, the foregoing description of the horticultural container 10 is equally applicable to the horticultural container 110 except as noted below.

The horticultural container 110 includes a sidewall 112, a base 114 extending from a bottom of the sidewall 112, and an upper rim 116 extending from a top of the sidewall. The upper rim 116 has a horizontal portion 118 and a downwardly projecting portion 120. The upper rim 116 includes one or more tag slots 122 for receiving a tag 126, and in the illustrated embodiment three tag slots circumferentially spaced around the upper rim 116, one or more chamfers or bevels 124, and in the illustrated embodiment three chamfers 124 radially outwardly spaced from and adjacent to a respective one of the tag slots 122, and a plurality of receiving locations 150 provided for receiving a hanger assembly to hang the container, and in the illustrated embodiment three receiving locations. The tag slots 122 and receiving locations 124 may have any suitable spacing around the upper rim 116, for example, the tag slots 122 may be interposed between receiving locations 124 circumferentially spaced around the upper rim 116. The receiving locations 124 may have a reduced radial thickness to the horizontal portion 118 of the upper rim 116 to facilitate interaction of the hanger assembly with the upper rim 116.

Turning now to FIGS. 10-14, an exemplary embodiment of the horticultural container is shown at 210. The horticultural container 210 is substantially the same as the above-referenced horticultural container 10, and consequently the same reference numerals but indexed by 200 are used to denote structures corresponding to similar structures in the horticultural containers. In addition, the foregoing description of the horticultural container 10 is equally applicable to the horticultural container 210 except as noted below.

The horticultural container 210 includes a sidewall 212, a base 214 extending from a bottom of the sidewall 212, and an upper rim 216 extending from a top of the sidewall. The upper rim 216 has a horizontal portion 218 and a downwardly projecting portion 220. The upper rim 216 includes one or more tag slots 222 for receiving a tag, and in the illustrated embodiment three tag slots circumferentially spaced around the upper rim 216, one or more chamfers or bevels 224, and in the illustrated embodiment three chamfers 224 radially outwardly spaced from and adjacent to a respective one of the tag slots 222, and a plurality of receiving locations 250 provided for receiving a hanger assembly to hang the container, and in the illustrated embodiment three receiving locations. The tag slots 222 and receiving locations 224 may have any suitable spacing around the upper rim 216, for example, the tag slots 222 may be interposed between receiving locations 224 circumferentially spaced around the upper rim 216. The receiving locations 224 may have a reduced radial thickness to the horizontal portion 218 of the upper rim 216 to facilitate interaction of the hanger assembly with the upper rim 216.

Although certain embodiments have been shown and described, it is understood that equivalents and modifications falling within the scope of the appended claims will occur to others who are skilled in the art upon the reading and understanding of this specification.

What is claimed is:

1. A horticultural container comprising:
   a body defining a chamber;
   a base extending from a bottom of the body to form with the body a closed end of the chamber; and
   an upper rim extending from a top of the body, the upper rim having:
      a plurality of spaced tag slots extending therethrough for receiving a respective tag, each tag slot having a length in a circumferential direction relative to a longitudinal axis of the body, and
      a chamfer having a radially innermost edge radially outwardly spaced from and adjacent to a radially outermost edge of each tag slot for receiving ears of the respective tag when the tag is in the tag slot, each chamfer being formed in the upper rim such that the chamfer extends into the upper rim and angles downward toward the base and away from the tag slot to form a respective interrupted area of the upper rim, and each chamfer having a length in the circumferential direction greater than the length of the respective tag slot.

2. The horticultural container according to claim 1, wherein the upper rim has a horizontal portion that extends radially outward from the top of the body and a downwardly projecting portion that extends downwardly from an outer edge of the horizontal portion towards the bottom of the body, and wherein the tag slot extends through the horizontal portion.

3. The horticultural container according to claim 2, wherein the chamfer is formed in the horizontal portion and downwardly extending portion.

4. The horticultural container according to claim 2, further including a plurality of guide ribs on an underside of the horizontal portion for guiding the tag when inserted through the tag slot from underneath the upper rim.

5. The horticultural container according to claim 4, wherein the plurality of guide ribs include a rib on opposite ends of the tag slot to circumferentially align the tag, and a plurality of ribs between the body and the tag slot and/or between the tag slot and the outer edge of the horizontal portion to radially align the tag.

6. The horticultural container according to claim 5, wherein the plurality of ribs between the body and the tag slot and/or between the tag slot and the outer edge of the horizontal portion are angled towards the tag slot.

7. The horticultural container according to claim 1, wherein the tag slot has a width in a radial direction less than a width of the chamfer in the radial direction.

8. A horticultural display system comprising:
   a horticultural container comprising:
      a body defining a chamber;
      a base attached to a bottom of the body; and
      an upper rim extending from a top of the body, the upper rim having at least one tag slot extending therethrough and at least one chamfer having a radially innermost edge radially outwardly spaced from and adjacent to a radially outermost edge of the at least one tag slot, the at least one chamfer being formed in the upper rim such that the at least one chamfer extends into the upper rim and angles downward toward the base and away from the at least one tag slot to form an interrupted area of the upper rim; and
   a tag inserted into one of the tag slots, the tag having a body, a neck extending upward from the body, a head extending upward from the neck, and a pair of ears on opposite sides of the head,
   wherein the head of the tag extends above the tag slot such that the neck is disposed in the tag slot and the ears extend radially outwardly from the tag slot to angle downward toward the base and radially overlap the chamfer adjacent the tag slot to secure the tag in the tag slot.

9. The horticultural display system according to claim 8, wherein the chamfer has a length in a circumferential direction relative to a longitudinal axis of the body that is greater than a length of the tag slot in the circumferential direction.

10. The horticultural display system according to claim 8, wherein the tag slot has a slot length in a circumferential direction of the upper rim relative to a longitudinal axis of the body, the neck has a first width less than the slot length, the head has a second width greater than the slot length, and the body of the tag has a third width greater than the second width.

11. The horticultural display system according to claim 10, wherein the chamfer has a length in the circumferential direction that is greater than the slot length.

12. The horticultural display system according to claim 8, wherein the body of the horticultural container is conical and the upper rim circumscribes the body.

13. The horticultural display system according to claim 12, wherein the at least one slot comprises a plurality of circumferentially spaced tag slots in the upper rim, and the at least one chamfer comprises a plurality of chamfers, each chamfer radially outwardly spaced from and adjacent to a respective one of the tag slots.

14. The horticultural display system according to claim 8, wherein the upper rim has a horizontal portion that extends radially outward from the top of the body and a downwardly projecting portion that extends downwardly from an outer edge of the horizontal portion towards the bottom of the body, and wherein the tag slot extends through the horizontal portion.

15. The horticultural display system according to claim 14, wherein the chamfer is formed in the horizontal portion and downwardly extending portion.

16. The horticultural display system according to claim 14, further including a plurality of guide ribs on an underside of the horizontal portion for guiding the tag when inserted through the tag slot from underneath the upper rim.

17. The horticultural display system according to claim 16, wherein the plurality of guide ribs include a rib on opposite ends of the tag slot to circumferentially align the tag, and a plurality of ribs between the body and the tag slot and/or between the tag slot and the outer edge of the horizontal portion to radially align the tag.

18. A horticultural container comprising:
a body defining a chamber and having a longitudinal axis; and
an upper rim extending from a top of the body, the upper rim having a horizontal portion that extends radially outward from the top of the body, a downwardly projecting portion that extends downwardly from an outer edge of the horizontal portion towards the bottom of the body, a plurality of circumferentially spaced tag slots extending through the horizontal portion for receiving a respective tag, and a chamfer having a radially innermost edge radially outwardly spaced from and adjacent to a radially outermost edge of each of the tag slots for receiving ears of the respective tag when the respective tag is in the tag slot, each chamfer being formed in the horizontal portion and the downwardly extending portion and angling downward to form a respective interrupted area of the upper rim,
wherein each chamfer has a length in a circumferential direction relative to the longitudinal axis that is greater than a length of the respective tag slot in the circumferential direction.

* * * * *